March 18, 1952     C. C. ROBINSON     2,590,069

ELECTRICAL SURGE DISCHARGE POWER UNIT

Filed July 12, 1950

INVENTOR.
Charles C. Robinson
BY
Wood, Arey, Herron & Evans
ATTORNEYS.

Patented Mar. 18, 1952

2,590,069

UNITED STATES PATENT OFFICE 2,590,069

ELECTRICAL SURGE DISCHARGE POWER UNIT

Charles C. Robinson, Newport, Ky., assignor to Shureflash Laboratory Inc., Newport, Ky., a corporation of Kentucky Application July 12, 1950, Serial No. 173,388

16 Claims. (Cl. 320—1)

This invention is directed to a battery-capacitor cartridge for activating photographic flash bulbs, detonators, and other electrically operated devices which require a momentary but powerful surge of current for most efficient operation. The unit also is capable of producing intermittent surge discharges in a closed circuit for automatic flashing of gas filled tubes such as in an animated display or signal apparatus.

The use of battery-capacitor circuits for firing flash bulbs is known in the art; however the present invention is concerned more particularly with a self-contained cartridge unit of practical size and capacity and with a method of treating the capacitor to prolong the useful life of the cartridge.

For many years, camera flash bulbs have been fired by small, low voltage dry cells of the flashlight type. Misfires are frequent because the cells age and become incapable, due to deterioration and internal resistance to deliver by brute force the power surge at the instant it is needed. The battery-capacitor cartridge of this invention constitutes a compact package of substantially the same size as the standard dry cells and is adapted to be inserted in the battery case as a long term replacement unit. The cartridge is supplied to the user ready for installation and consists essentially of a small, long-lived battery, capable of delivering a relatively high voltage, combined with a capacitor which is connected through a resistor to the battery terminals so that the capacitor is charged constantly at a slow rate from the battery. The flash bulb is connected across the condenser terminals through a switch so that the full capacitor charge is discharged instantly through the bulb. Thus the capacitor is charged at a relatively slow rate between flashes and delivers a much greater surge than the battery itself can supply. In practice, a time interval of a few seconds is sufficient to fully recharge the capacitor after firing, even though the battery is one or two years old or in weakened condition.

In its utility it is a power source for intermittently flashing a gas tube continuously, the capacitor terminals are connected directly to the terminals of the tube and, as the charge builds up in the capacitor, it breaks down the resistance of the tube and discharges through it. The time delay between flashes is governed by the resistor between the battery and capacitor; therefore by changing the value of the resistor, the flash frequency can be adjusted to a desired rate.

The unit is of particular utility in firing camera flash bulbs and is disclosed in this capacity as a preferred embodiment. Commercial cameras using flash bulbs are equipped with contacts interconnected with the shutter mechanism and arranged to fire the bulb at the instant the shutter is opened. The conventional flash gun includes a battery case similar to a flashlight body for holding the dry cells, with contact elements in the case for completing a circuit from the cells through the shutter switch to the flash bulb.

One of the primary objects of the invention has been to provide a sealed power cartridge having a useful life span many times greater than the conventional dry cells, and adapted to be installed conveniently as a replacement for the dry cells.

A 22½ volt "B" type battery such as a standard hearing aid battery has been found highly satisfactory as a source of energy for the cartridge. Such batteries have a series of plates which are stacked one upon another, the construction being such that the plates are incapable of withstanding a great deal of pressure. In addition, it is necessary that the electrical components of the unit be insulated from one another and from the metal shell which surrounds them, with their terminals interconnected with one another to establish an electrical circuit. The structure for housing the components therefore constitutes insulating core having cavities for nesting individually the battery, capacitor and resistor with the component leads in electrical contact with one another.

The core and components are retained in a metal shell and are locked in by curling an end of the shell upon the exposed end of the core, with the core in pressure engagement against a closure cap at the opposite end of the shell. To prevent excessive pressure upon the battery the pressure imposed by the curled end of the shell is absorbed by the core, with the battery under controlled pressure engagement against a yieldable washer interposed between the battery terminal and closure cap.

A further object of the invention has been to provide a liner or core structure of sectional design which makes possible a speedy and convenient assembly of the components within the core, the components being placed in cavities formed in one of the sections and the sections then placed together and slipped into the shell. For this purpose, each section includes complementary recesses, which when placed face-to-face, constitute the component cavities. In assembling the unit, the components are placed directly in the open recesses of one section with their terminal wires inserted into passageways formed in the core, then the second core section is placed upon the first to enclose the components. The assembled core is then inserted into the open end of the shell. After curling the end of the shell with a suitable tool, a sealing compound such as a paraffin is deposited upon the curled end to seal the components hermetically within the shell.

In practicing the invention, it was discovered that under normal conditions there is a slight but constant energy leak through the capacitor, causing slow deterioration and eventual exhaustion of the battery even when the unit is in storage. This defect has been remedied by the discovery of a method of artificially aging the capacitor, which is found to decrease leakage to such a small factor that substantially all of the battery energy is available for actual work. The small "B" battery used in the unit has a life expectancy of one to two years and tests indicate that the artificially aged capacitors will, by inhibiting leakage, extend the active life of the cartridge almost to the normal life span of the battery.

The aging process is carried out before the capacitor is assembled in the unit and is completed in approximately twenty-four hours. During this period, a D. C. current which is several times higher than the "B" battery voltage, is applied to the capacitor terminals to charge it to its maximum working voltage. At intervals during this period the capacitor is disconnected and discharged by short circuiting its terminals. In one example, the capacitor is treated at 150 volts and is discharged approximately every two hours during a twenty-four hour treatment period. When assembled with a 22½ volt battery after aging, resistance to leakage is increased to the point where the useful life of the cartridge is several times greater than cartridges assembled with untreated capacitors.

Other features and advantages of the invention will be more fully disclosed in the following description in conjunction with the drawings.

Figure 1:
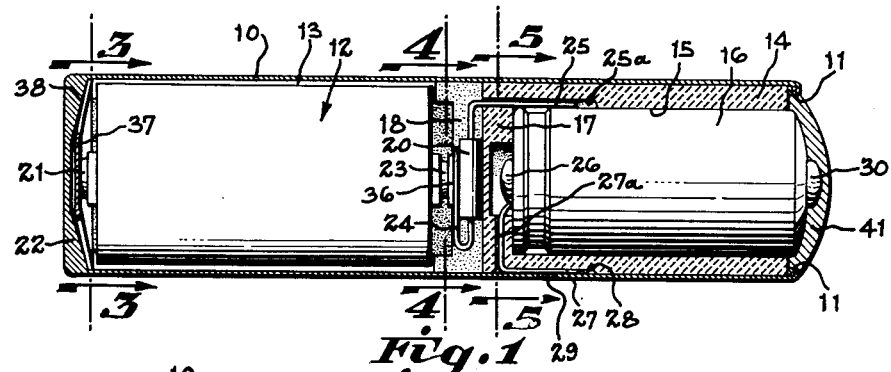
Figure 1 is a longitudinal sectional view illustrating the general arrangement of the assembled cartridge.

As best disclosed in Figure 1, the shell 10, which houses the assembled core and components, preferably is formed of aluminum tubing having a closure formed at one end and having its opposite end curled as at 11 to clamp the core and its components permanently within the shell. The battery which is indicated generally at 12 is housed within a cavity 13 at forward end of the core or liner 14, which may be molded of a thermo-plastic material having dielectric properties, such as polystyrene, suitably cored to provide the necessary component cavities. The rearward end of the liner 14 is provided with a cavity 15 for the capacitor 16, and there is provided an intermediate septum 17 separating the battery from the capacitor. Within the septum there is formed a transverse cavity 18 for housing the resistor 20. In order to facilitate assembly, the core 14 is split longitudinally to form two separable sections, each having semi-circular recesses complementary to each other to form the battery and capacitor cavities.

Figure 4:
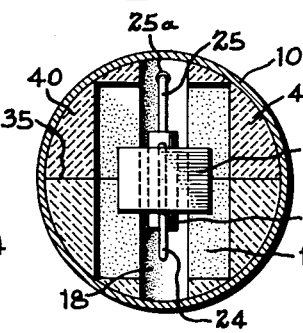
Figure 4 is a sectional view similar to Figure 3 taken on line 4—4, Figure 1, showing the position of the resistor within its cavity with the relationship of the battery terminal to the resistor lead.
Figure 5:
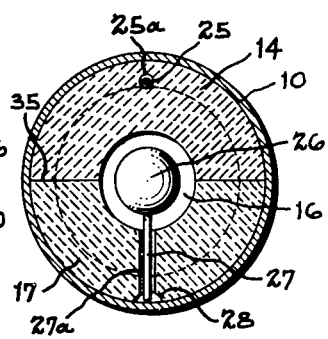
Figure 5 is a sectional view taken on line 5—5 showing the capacitor and the arrangement of the capacitor and resistor leads.

The battery is provided with a forward terminal 21 which makes electrical contact with the end closure 22 of the shell 10 as hereinafter disclosed, while the rearward terminal 23 of the battery makes contact with the lead 24 of the resistor 20. The opposite lead 25 of the resistor extends rearwardly through a passageway 25a open to the capacitor cavity 15. Lead 25 therefore is threaded between the cavity wall and the outer metallic shell of the capacitor, as shown in Figures 4 and 5 and thus is pressed in electrical contact with the capacitor. The forward terminal 26 of the capacitor includes a lead wire 27 which extends through a transverse aperture 27a extending from the capacitor core to the outside circumference of the liner and in pressure engagement with the shell 10. In order to insure a good electrical contact between the lead and shell, a small hole is drilled through the shell and the lead is spot soldered as at 29 through the hole after assembly. Terminal 30 of the capacitor projects from the open rear end of shell 10 in a position to be engaged directly against the contact of the flash bulb when the unit is inserted in the battery case of the flash gun.

Figure 6:
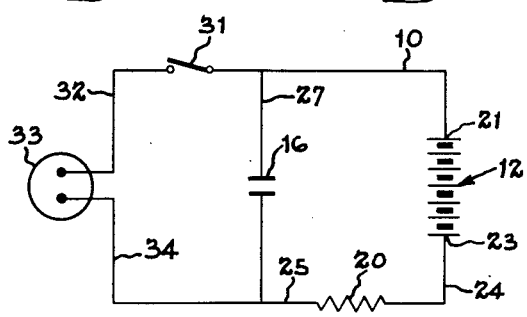
Figure 6 is an electrical diagram of the battery-capacitor unit interconnected with a flash bulb and firing switch.

The electrical circuit established by the assembled components is disclosed in Figure 6 and duplicates the circuit of one or a series of dry cells which are normally placed in the flash gun battery case. Thus, the circuit from the battery terminal 21 is completed by way of the shell 10 which is indicated in the diagram by the line 10, through the shutter switch 31 by way of line 32 to one terminal of the flash bulb 33. The line 32 represents the standard electrical connection in the camera from the battery case of the flash gun to the shutter switch and from the switch to one terminal of the flash bulb socket. The opposite side of the battery circuit is completed by way of resistor lead 24 which is in contact with rearward terminal 23 of the battery and represented by line 24 in the diagram. From the resistor 20, the circuit extends by way of line 25 (resistor lead 25) to the opposite terminal of the lamp 33, by way of line 34 which is also a part of the flash gun circuit.

The capacitor 16 is connected across the opposite terminals of the battery by the lines 25 and 27 which represent the resistor and capacitor leads. By interposing the resistor 20 in one of the lines the capacitor charging rate is regulated; the resistor prevents any substantial discharge of the battery when the shutter switch 31 momentarily is closed to fire the lamp. The charge is delivered instantly but in a powerful surge from the capacitor to the lamp while the resistor permits gradual recharging of the capacitor where the energy is stored until needed. In practice the charge is replaced in the capacitor in a matter of seconds, although as the battery ages, the charging time may increase slightly. In any event, it has been found in practice that the capacitor will become fully charged even with batteries one or two years old; thus in spite of weakened batteries, a powerful surge of energy flows from the capacitor to the flash bulb to provide reliable operation under the most adverse conditions of use.

Figure 2:
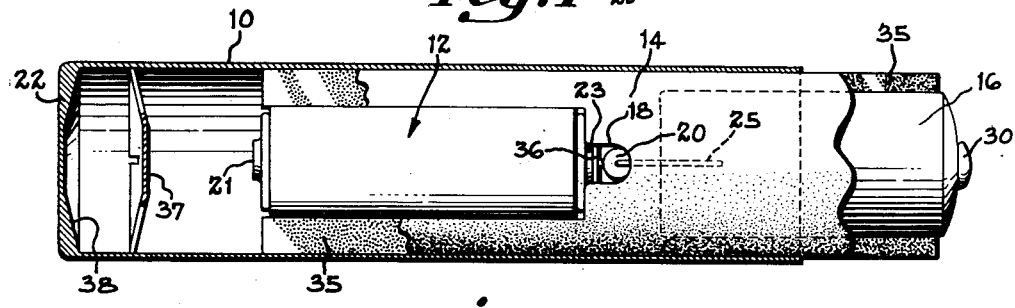
Figure 2 is a view similar to Figure 1, illustrating the cartridge in the process of assembly.

As disclosed in Figure 2, the unit is assembled by placing the electrical components within the plastic core, inserting the assembled core from the open end of the shell 10, with the forward battery terminal 21 engaged against the closed end of the shell. After insertion of the core, the curl 11 is rolled upon the opposite end of the tube 10 to engage the rearward end of the core and thus lock the cartridge in assembly. In practice, the terminal wire 25 of resistor 29 is preformed so as to interfit with the passageway 25a of the core.

In order to simplify and speed up assembly, the liner or core 14 is split longitudinally as indicated at line 35 thus presenting the battery and capacitor cavities as open faced, semi-circular recesses, which when placed face-to-face, constitute the respective cavities. This arrangement permits the resistor lead 25 to be threaded diretly through the aperture 25a leading to the capacitor cavity, and the capacitor lead 27 to be threaded conveniently through its transverse aperture 27a. With the battery, capacitor, and resistor placed in the recesses of one liner section, the mating section is placed in position, the capacitor lead 27 bent down to reside within the longitudinal passageway 29, and the core is then slipped into the shell. The cavities fit closely around the components to hold them securely in position and the outside diameter of the assembled core establishes a light push fit with the inside diameter of the tube to press the half-sections of the liner firmly together. In its preferred form, a contact plate 36, formed of copper, is soldered to the resistor lead 24 (Figures 1 and 4) to provide a contact surface for engagement by the battery terminal 23.

The function of liner 14 is to insulate the electrical components from one another, from the shell, and to prevent excessive pressure from being imposed against the opposite ends of the battery 12, causing injury to it. For this purpose, the battery cavity 13 is slightly longer than the overall length of the battery, so that the battery may be butted against the intermediate wall 17 with its opposite end under controlled pressure engagement against the end plate 22 of the shell to provide a good electrical connection between the plate and the terminal. For this purpose there is interposed between the terminal and shell, a deformable washer 37 formed of resilient sheet metal having good conductivity. The diameter of the washer is slightly smaller than the inside diameter of the shell so that it may be placed in the shell with its periphery resting against the edge of the slightly conical face 38 of the end wall of the inner shell as shown in Figure 2. When the curl 11 is rolled upon the opposite end of the shell, the core and battery are pressed forwardly and the washer 37 is deformed as shown in Figure 1; thus in this condition a constant but controlled pressure is exerted by the washer against the battery and core. This pressure insures a reliable electrical connection between the battery terminals and the shell and resistor lead 24 without physically overloading the battery.

Figure 3:
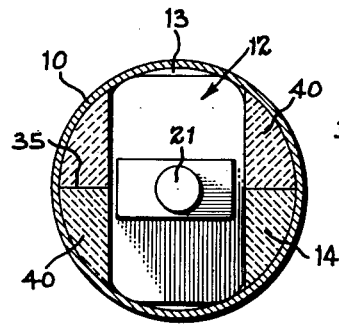
Figure 3 is a cross sectional view taken on line 3—3, Figure 1, illustrating the position of the battery with respect to its cavity.

As shown in Figure 3, the battery 12 is generally oblong as viewed from the end, with its major length extending for the full diameter of the shell 10. In order to accommodate the battery its cavity in cross section constitutes a pair of limbs 40-40, which straddle the battery. The battery is provided with an insulating shell which prevents an electrical connection with the shell at the points of contact. The liner thus is bisected by the battery which is engaged upon opposite sides by the limbs, the ends of the limbs being in pressure engagement against the end plate 22 to protect the battery against excessive pressure.

As outlined above, energy leakage from the condenser resulting in power loss and eventual discharge of battery during storage has been reduced to a very small factor by a method of overcharging the condenser during an artificial aging period, then discharging it at intervals prior to assembly of the capacitor in the cartridge. This treatment, it is believed, causes certain electrochemical changes to take place within the capacitor which, by increasing its internal resistance, practically eliminates leakage of energy. As one example, in treating a 40 mfd. capacitor having a working voltage of 150, which is used with a 22½ volt "B" battery in a cartridge intended for average flash bulb firing, the capacitor is aged for a 24 hour period at 150 volts. During this period, at 2 hour intervals, the capacitor is discharged by interrupting the 150 volt charging circuit and short circuiting the capacitor terminals momentarily. This operation may be performed with the capacitor units mounted in banks in a suitable fixture with their terminals connected across the charging lines. Suitable switches interposed in the lines, are arranged to interrupt the charging circuit and interconnect the charging lines with one another to discharge the capacitors collectively at the necessary intervals. The voltage, treatment period, and discharge intervals are varied, as determined by experiment, in accordance with the characteristics of various capacitor units to produce the proper leakage resistance.

After the treated capacitor is installed and the shell curled, the assembled cartridge is hermetically sealed by depositing a sealing material, such as melted paraffin, upon the curled end 11 of the shell as indicated at 41 in Figure 1. This seal prevents the absorption of moisture and thus preserves the cartridge against deterioration. For maximum protection, the seal covers the exposed terminal 30 of the capacitor to prevent accidental contact across the terminal and outer shell during storage or handling. Before inserting the cartridge in the battery case, the sealing material is scraped from the terminal to expose it to the flash bulb contact.

As previously indicated, the cartridge can also be used to energize gas discharge tubes for animated advertising displays, signal devices and the like without any alteration in structure. In such utility the cartridge discharges intermittently in an automatic manner as the tube resistance is broken down by the voltage built up in the capacitor. Also, it is contemplated to provide cartridges having several batteries connected in series to provide higher voltages in multiples of 22½ volts. In one instance, the tube and core are made sufficiently long to receive a pair of 22½ volt batteries end-to-end to produce in series a discharge of 45 volts feeding into the capacitor.

In the form disclosed, it is intended that the cartridge be discarded and replaced with a new one when it becomes exhausted, because under normal usage, it will have a life span of several years. However under continuous service in flashing gas tubes or in extremely heavy duty in photography, the battery may be exhausted in a shorter period. In such cases the cartridge will be of two-piece construction with the pieces telescopically interfitted with one another under frictional engagement, one section enclosing the battery and the other section enclosing the capacitor end of the liner. While the cartridge is otherwise the same as the one-piece structure, this arrangement will permit the battery section to be removed by pulling off, thus permitting a new battery to be inserted and the shell section pressed back in place.

Having described my invention, I claim:

1. In an electrical power cartridge having a battery and capacitor each having respective pairs of terminals, a metal shell, a liner formed of dielectric material adapted to be inserted in the shell, the liner having respective cavities formed therein for confining the battery and capacitor, one terminal of the battery and capacitor being in common electrical connection with the shell, the respective second terminals of the battery and capacitor being insulated from the shell and interconnected with one another, the shell having an open end exposing the second terminal of the capacitor to provide a capacitor surge discharge circuit across the second capacitor terminal and shell.

2. In an electrical power cartridge having a battery, resistor, and capacitor, a metal shell, a liner formed of dielectric material adapted to be inserted in the shell, the liner having respective cavities formed therein for receiving respectively the battery, resistor, and capacitor, one terminal of the battery and capacitor being in common electrical connection with the shell, the respective second terminal of the battery and capacitor being insulated from the shell and electrically interconnected with one another through the resistor to restrict the flow of current from the battery to the capacitor, the shell having an open end exposing the second terminal of the capacitor to provide a capacitor surge discharge circuit across the second capacitor terminal and shell.

3. In an electrical power cartridge, a battery, a resistor, a capacitor, the battery and resistor having respective pairs of terminals at opposite ends thereof, the capacitor having a metal housing forming one terminal and having a second terminal at one end thereof insulated from the housing, a cartridge shell formed of metal, a liner formed of dielectric material adapted to be inserted in the cartridge shell, the liner having respective cavities adapted to receive the battery, resistor and capacitor, one terminal of the battery being in electrical connection with the shell, the second terminal of the capacitor being in electrical connection with the shell in common with the battery terminal, the opposite terminal of the battery being electrically connected with the said capacitor housing through the terminals of the resistor to restrict the flow of energy from the battery to the capacitor, one end of the cartridge shell being open to expose the end of the capacitor housing and provide a capacitor surge discharge circuit across the capacitor housing and cartridge shell.

4. In an electrical power cartridge having a battery and capacitor including respective terminals electrically interconnected with one another, the capacitor being arranged to discharge surges of energy, a metal cartridge shell, a liner formed of dielectric material adapted to be inserted in the cartridge shell, the liner constituting a pair of mating half sections, each having a pair of complementary recesses adapted to form cavities for confining the battery and capacitor when the half sections are placed in face-to-face relationship.

5. In an electrical power cartridge having a battery and capacitor including respective terminals electrically interconnected with one another, the capacitor being arranged to discharge surges of energy, a metal cartridge shell, a liner formed of dielectric material adapted to be inserted in the cartridge shell, the liner constituting a pair of mating half sections, each having a pair of complementary recesses adapted to form cavities for confining the battery and capacitor when the half sections are placed in face-to-face relationship, and means in the liner arranged to provide an electrical circuit between one set of battery and capacitor terminals, with the cartridge shell electrically interconnected with the second set of battery and capacitor terminals to provide a capacitor surge discharge circuit across the second capacitor terminal and cartridge shell.

6. In an electrical power cartridge having a battery and capacitor, a metal cartridge shell of cylindrical form, a cylindrical liner formed of dielectric material adapted to be inserted in the shell, the liner being formed of longitudinal half sections each having a recess adapted to form a capacitor cavity upon assembly of the half sections, one of the half sections having a passageway extending through the cavity wall, the outside diameter of the section having a slot joining the passageway, the capacitor having a lead wire extending through the passageway and slot and in pressure engagement with the metal cartridge shell to form one side of the cartridge circuit.

7. In an electrical power cartridge having a battery, capacitor and resistor, a metal cartridge shell of cylindrical form, a cylindrical liner formed of dielectric material adapted to be inserted in the shell, the liner being formed of separable longitudinal sections each having a complementary recess adapted to form a capacitor cavity in assembly, the sections having a recess at one end of the cavity to receive the resistor and having a passageway communicating with the cavity, the capacitor having a metal shell forming one of its terminals, the resistor having lead wires and having one of the wires extended through the passageway into the cavity to establish an electrical circuit with the capacitor shell in assembly.

8. In an electrical power cartridge having a battery, capacitor and resistor, a metal cartridge shell of cylindrical form, a cylindrical liner formed of dielectric material adapted to be inserted in the shell, the liner being formed of separable longitudinal sections each having a complementary recess adapted to form a capacitor cavity in assembly, the sections having a recess at one end of the cavity to receive the resistor and having a passageway communicating with the cavity, the capacitor having a metal shell forming one of its terminals, the resistor having lead wires and having one of the wires extended through the passageway into the cavity to establish an electrical circuit with the capacitor shell in assembly, the capacitor having a lead wire forming its opposite terminal, one of the liner sections having a second passageway extending through the cavity wall to the outside diameter of the section, the capacitor lead wire being extended through the second passageway and interposed between the shell and liner in pressure engagement with the metal cartridge shell.

9. In an electrical power cartridge having a battery and capacitor extending longitudinally and a resistor extending transversely thereof, a metal cartridge shell having an end wall, a liner formed of dielectric material adapted to be inserted in the cartridge shell, the liner constituting a pair of mating half sections, each half section having a complementary longitudinal recess adapted to form a capacitor cavity and a pair of limbs adapted to straddle the battery when the sections are placed face-to-face for insertion in the cartridge shell, a wall intermediate the said longitudinal recesses and limbs, the said wall having a transverse recess adapted to nest the resistor, the ends of the said limbs being adapted to reside against the end wall of the cartridge shell, the opposite end of the shell being curled against the opposite end of the liner to clamp the liner in pressure engagement between the curl and said end wall.

10. In an electric power cartridge having a battery, capacitor and resistor and adapted to be inserted in the battery case of a flash gun or the like to discharge surges of energy, a metallic retainer shell, a liner adapted to be inserted in the shell, the said liner being formed of electrical insulating material and having cavities arranged to confine the battery and capacitor, the liner constituting complementary half sections with the cavities split longitudinally for insertion of the battery and capacitor, an intermediate wall disposed between the battery and capacitor cavities, the said wall having a recess adapted to receive the resistor, the liner having passageways interconnecting the said cavities, the said resistor having opposite leads extending through the passageways into the respective cavities to establish an electrical circuit within the cartridge between the battery and capacitor.

11. In an electrical surge discharge cartridge adapted to fire flash bulbs, a core member formed of dielectric material, the said core member having an internal cavity extending axially into one end thereof adapted to receive a capacitor, the opposite end of the core member being provided with a pair of spaced limbs adapted to maintain a battery in axial alignment with said internal cavity, a transverse wall extending across the base of said spaced limbs, the transverse wall adapted to provide seat for an end of the battery when the same is inserted between said spaced limbs, the opposite side of the transverse wall adapted to provide a seat for an end of the capacitor when the capacitor is inserted in said internal cavity, and a battery retaining member anchored upon the core member adapted to engage the opposite end of the battery to maintain the battery axially in engagement against said transverse wall.

12. In an electrical power cartridge adapted to fire flash bulbs, a cylindrical core member formed of dielectric material, the said core member having an internal cylindrical bore extending axially into one end thereof adapted to telescopically receive a cylindrical capacitor, the opposite end of the core member being provided with a pair of spaced limbs extending axially in a direction opposite to said cylindrical bore and adapted to straddle the opposite sides of a rectangular battery to maintain the battery in axial alignment with the cylindrical bore, a transverse wall extending across the base of said spaced limbs and joining the same together, said transverse wall adapted to provide seat for an end of the battery when the same is inserted between said spaced limbs, the opposite side of the transverse wall adapted to provide a seat for an end of the capacitor when the capacitor is inserted in said internal cylindrical bore, a battery retaining member anchored on the core member adapted to engage the opposite end of the battery and yieldable means cooperating with the battery retaining member adapted to urge the battery under predetermined pressure axially against said transverse wall.

13. In an electrical power cartridge adapted to receive a battery which is rectangular in cross section, the assembled cartridge being adapted to be inserted in a cylindrical container, a cylindrical core member formed of dielectric material, the core member having an internal cylindrical bore open at one end and extending axially thereof, a cylindrical capacitor confined in said bore, a pair of spaced retainer limbs extending axially from the end of the core member in a direction opposite to the open end of said internal cylindrical bore adapted to receive the rectangular battery, the spacing of said limbs corresponding substantially to the thickness of the battery and the diameter of the core member corresponding substantially to the width of the battery, whereby upon insertion of the assembled cartridge in a cylindrical container, the battery is confined in axial alignment with said cylindrical capacitor by engagement of said retainer limbs upon two sides of the battery and by engagement of the cylindrical container upon the other two sides of the battery.

14. An electrical surge discharge cartridge adapted to be inserted in the battery case of a flash gun to fire flash bulbs, said power cartridge comprising; a cylindrical core formed of dielectric material, the said core having an internal bore extending axially from its rearward end, a capacitor confined in said bore, the capacitor having a forward terminal and having a metal shell forming a second terminal, the forward end of the core being adapted to receive a battery having forward and rearward terminals, internal electrical conducting means within the core adapted to provide one side of an electrical circuit from the rearward terminal of a battery and the metal shell of the capacitor when a battery is placed in the core, external conducting means anchored upon the core adapted to engage the forward terminal of a battery, the external conducting means being in electrical connection with the forward terminal of the capacitor and adapted to provide the second side of an electrical circuit from the forward terminal of a battery to the forward terminal of the capacitor, the rearward end of the metal shell of the capacitor being exposed at the open end of the said internal bore and adapted to provide one side of the surge discharge circuit and the external conducting means at the opposite end of the core providing the second side of the circuit when the assembled cartridge is inserted in the battery case of a flash gun.

15. An electrical surge discharge cartridge adapted to be inserted in the battery case of a flash gun to fire flash bulbs, said power cartridge comprising; a cylindrical core formed of dielectric material, the said core having an internal bore extending axially from its rearward end, a capacitor confined in said bore, the capacitor having a forward terminal and having a metal shell forming a second terminal, battery holding means on the forward end of the core, a battery having forward and rearward terminals confined in said battery holding means and in axial alignment with the capacitor, internal electrical conducting means within the core adapted to provide one side of an electrical circuit between the rearward terminal of the battery and the metal shell of the capacitor, a resistor confined within the cylindrical core and interposed in said internal electrical conducting means, external conducting means anchored upon the core engaging the forward terminal or the battery, the external conducting means being in electrical connection with the forward terminal of the capacitor and adapted to provide the second side of an electrical circuit from the forward terminal of the battery to the forward terminal of the capacitor, the rearward end of the metal shell of the capacitor being exposed at the open end of the said internal bore and adapted to provide one side of the surge discharge circuit and the said external conducting means at the opposite end of the core providing the second side of the circuit when the assembled cartridge is inserted in the battery case of a flash gun.

16. An electrical surge discharge cartridge adapted to be inserted in the battery case of a flash gun to fire flash bulbs, said power cartridge comprising; a cylindrical core formed of dielectric material, the said core having an internal bore extending axially from its rearward end, a capacitor confined in said bore, the capacitor having a forward terminal and having a metal shell forming a second terminal, the forward end of the core being provided with a pair of spaced limbs, a transverse wall joining the base of said spaced limbs, a battery having forward and rearward terminals confined transversely between said spaced limbs in axial alignment with the capacitor, an electrical contact mounted upon said intermediate wall adapted to engage the rearward terminal of the battery, internal conducting means extending from said contact to one terminal of the capacitor and providing one side of a circuit between the battery and capacitor, external conducting means anchored upon the core engaging the forward battery terminal and being in electrical connection with the second terminal of the capacitor and providing the second side of an electrical circuit from the forward terminal of the battery to the second terminal of the capacitor, the rearward end of the capacitor metal shell being exposed at the open end of the said internal bore and adapted to provide one side of the surge discharge circuit and the said external conducting means at the opposite end of the core providing the second side of the circuit when the assembled cartridge is inserted in the battery case of a flash gun.

CHARLES C. ROBINSON.

REFERENCES CITED

The following references are of record in the file of this patent:

UNITED STATES PATENTS

| Number | Name | Date |
| --- | --- | --- |
| 1,658,976 | Edelman | Feb. 14, 1928 |
| 2,151,806 | Schnoll et al. | Mar. 28, 1939 |
| 2,393,966 | Brennan | Feb. 5, 1946 |
| 2,470,895 | Marlowe et al. | May 24, 1949 |
| 2,498,640 | Beck | Feb. 20, 1950 |
| 2,507,226 | Siezen | May 9, 1950 |